Sept. 7, 1965       F. X. MAYER ETAL       3,205,065
PROCESS FOR REDUCING IRON OXIDES
Filed Feb. 20, 1963
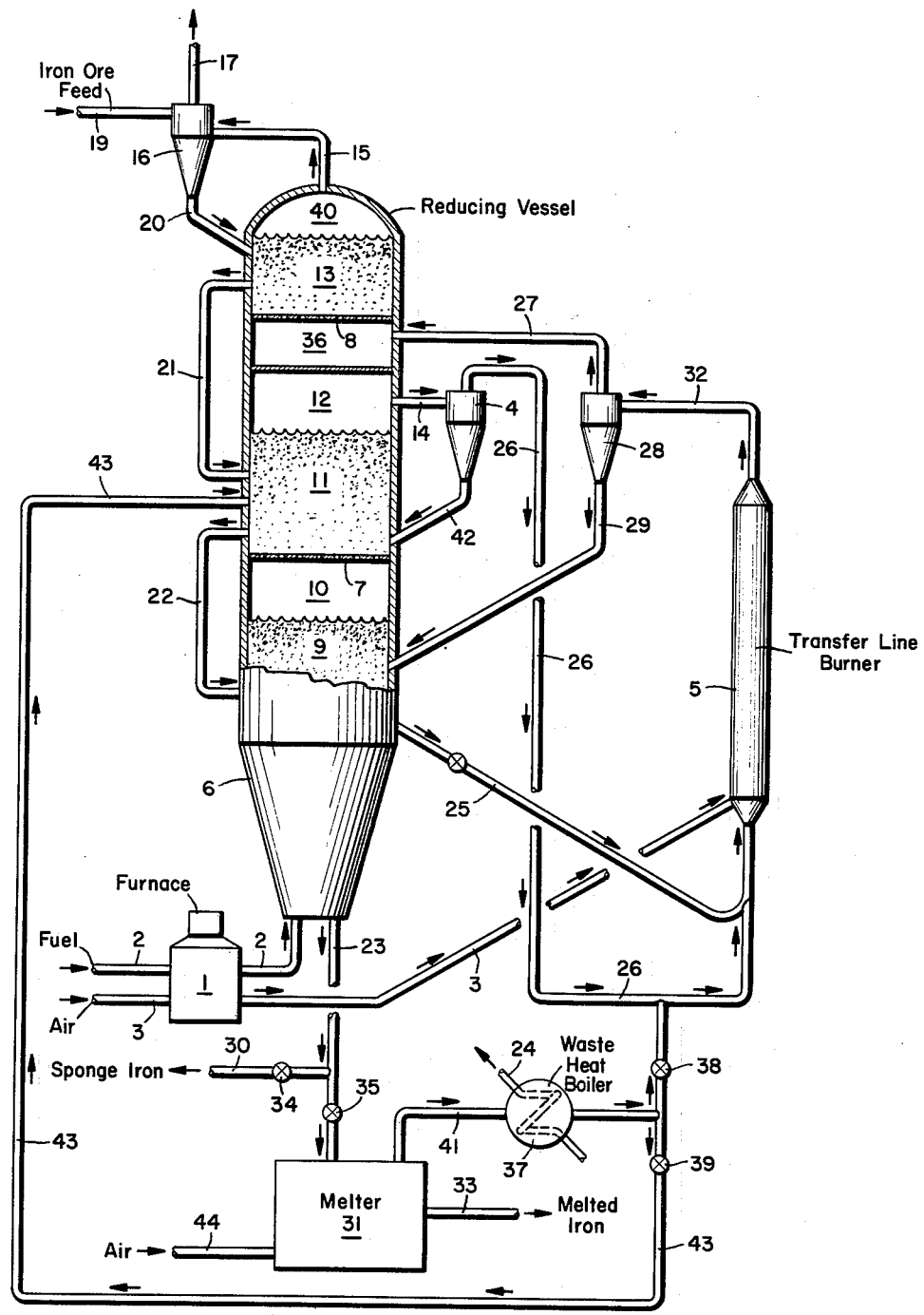
Francis Xavier Mayer
Ivan Mayer          INVENTORS
BY *Perry Carvellas*
PATENT ATTORNEY

United States Patent Office 3,205,065
Patented Sept. 7, 1965

3,205,065
PROCESS FOR REDUCING IRON OXIDES
Francis Xavier Mayer, Baton Rouge, La., and Ivan Mayer, Summit, N.J., assignors to Esso Research and Engineering Company, a corporation of Delaware
Filed Feb. 20, 1963, Ser. No. 259,855
12 Claims. (Cl. 75—26)

The present invention relates to an improved process for producing iron from iron oxide. More particularly, the present invention relates to a method of direct iron ore reduction utilizing hydrocarbons to reduce the iron ore. Specifically, the present invention relates to a rpocess of reducing iron ore in a fluidized bed by direct injection of hydrocarbons into the bed whereby the hydrocarbons are endothermically cracked and the iron ore is endothermically reduced and the heat to carry out both of these reactions is provided by an external heater. In the external heater off gases from the cracking and reducing reactions are partially oxidized with an oxygen-containing gas to heat cabron covered reduced iron which is transferred from the reducing zone to the heating zone and recycled to the reducing zone. The oxidation conditions in the transfer line heater are critical and are controlled in such a manner that the reduced iron is not back-oxidized while the iron is being heated to a higher temperature.

Specifically, the rpesent invention relates to a process of direct injection of hydrocarbons into a hot fluidized bed of partially reduced iron oxides whereby the hydrocarbons are cracked to hydrogen and carbon. The reducing gases formed from the cracked products react with the iron oxides to reduce the iron oxides to metallic iron. This process allows the selection of conditions for the cracking and reducing reactions carried out in the reducing zone, and the selection of different conditions for partially oxidizing the off gases and heating the reduced iron without back-oxidation in the heater. Therefore, since carried out separately, the most efficient set of conditions can be selected for each of the reactions.

Many efforts have been made to reduce iron ore in fluidized beds using hydrocarbons. Several difficulties have been encountered such as bed bogging and sintering of the particles when operating at elevated temperatures. This results in loss of fluidization and inoperability of the process. In addition, in most of these processes the reducing gases have been primarily hydrogen or a mixture of hydrogen and carbon monoxide made by the reforming of various hydrocarbon fuels. The reforming operation is both troublesome and expensive and results in high cost for the reducing gases and in excessive quantities of gases passing through the reducing equipment. In addition, excess air over the present invention is required since all of the oxygen must be supplied from external sources. In the present invention, practically all of the oxygen in the reducing zone originates from the iron ore. This results in considerably smaller equipment, better utilization of fuel, and minimum requirements for excess air.

Probably one of the mose important reasons for not using hydrocarbons to directly reduce the iron ore is found in the particularly poor thermal characteristics of the ordinary hydrocarbons as a reducing agent for iron ore. The prevailing reduction reactions involving such hydrocarbons are strongly endothermic and their rates become appreciable only at relatively high temperatures. In order to supply the heat required for these reactions and to maintain temperatures at the high levels necessary in the reduction zone by preheating either the gas feed or the ore or both, requires prohibitively high preheating temperatures. If this heat is to be supplied from an external source through the walls of the reducing zone, temperature gradients are undesirably high. If it is attempted to generate the heat within the reducing zone itself by a combustion of fuels, the reactions must be carefully controlled so that the ratio of $CO_2$ to CO and $H_2O$ to $H_2$ in the gas phase stays below the equilibrium values, at the temperature employed, of the oxidation reduction reactions of iron oxides in the presence of carbon oxides and water. With reference to the external burner this limitation is circumvented by application of the carbon cover and maintaining short residence time.

When attempting to generate sufficient heat by partial combustion of hydrocarbons in contact with the ore and/or reduced iron in the reducing zone, other difficulties arise. First, the oxidation of hydrocarbons merely to CO has only a rather insignificant positive heat effect so that when substantial amounts of heat are required, the hydrocarbon consumption is excessive. Far more heat may be produced by burning the hydrocarbons all the way to $CO_2$ and water. However, only a limited amount of $CO_2$ and $H_2O$ concentration may be tolerated in the ferrous reduction zone, if the reoxidation of the metal is to be avoided. It is extremely difficult to reconcile the requirements of efficient heat generation and reduction when using hydrocarbons both as the reducing and combustion supporting agent. It is difficult to utilize hydrocarbons as a source of reducing gases to reduce FeO to metallic iron, and to supply heat to this zone by adding air to partially oxidize the hydrocarbons because of the danger of back-oxidation of the reduced iron to iron oxides.

Attempts have been made to supply the necessary heat for the endothermic reactions in a reaction zone by passing through the reaction zone heated inert solid materials which are heated externally and transferred to the reaction zone where they transmit heat to the reaction zone. However, utilization of inert solids cycled through the reaction zone has proved unsuccessful because of the difficulty in obtaining efficient separation of the inert solids from the material being reacted in the reaction zone. Inefficient separation results in the contamination of the reduced iron product with inert solids. Further there is a loss of heat efficiency in a process of this type in the transfer of the heat to the ore, due to the necessity of using larger and more dense inert particles than the ore as the heat carrier so separation of the heat carrier from the ore can be obtained.

Reducing gases can be partially oxidized with air to provide heat for the endothermic reduction reactions in the first and second stages of the reducing zone where the ferric iron oxides are reduced to a lower degree of oxidation. For example, in the $Fe_2O_3$ reduction to $Fe_3O_4$ the reducing gases can be partially oxidized with air, under carefully controlled conditions, to provide the necessary heat for the reduction in that zone. This is because, due to the higher state of oxidation of the iron in that zone, the danger of back-oxidation by $CO_2$ or $H_2O$ in the reducing gases is much less than in the zone containing the FeO and the metallic iron.

Making reducing gases utilizing a separate gas generator to produce hydrogen or a mixture of carbon monoxide and hydrogen increases the cost of the synthesis gas. One of the major expenses in iron ore reduction is the cost of providing reducing gas. The largest single cost item in the process is the fuel needed to meet the heat requirements for the endothermic reactions such as cracking of the hydrocarbons and reducing of the iron oxide to metallic iron. Any process which efficiently utilizes the reducing gases and minimizes the fuel heating requirements will substantially improve the direct iron ore reduction process. Efficient use of off gases from the iron ore reduction process has been difficult since if air is used in the process the off gases have relatively low value as fuel due to high nitrogen content, and the gases cannot be recycled to the iron ore reduction process without considerable expense for equipment to remove nitrogen, carbon dioxide, and water. Another problem involved in direct iron ore reduction is that the reduced metal is normally extremely pyrophoric and on contact with air will oxidize very rapidly.

In accordance with the present invention, direct injection of hydrocarbons and reduction of iron ore is accomplished in an iron ore reduction zone and the heat for endothermic reactions is provided by an external heater. It has been found that by carrying out the process in a series of dense fluidized beds of finely divided iron ore ideal heat transfer characteristics and mixing speed approximating perfect uniformity of solids composition are obtained. This permits maintenance of the critical conditions of heat generation, temperature and pressure and the proper ratios of the gaseous reactants in the reaction products within the narrow ranges required to carry out the process. In carrying out the process in fluidized bed reaction zones the flow of materials can be carefully controlled and the desired conditions maintained.

In accordance with an embodiment of the present invention the iron ore is reduced in three stages; namely, $Fe_2O_3$ to $Fe_3O_4$, $Fe_3O_4$ to FeO, and FeO to Fe. Each of the stages can comprise one or more distinct zones. One of the most critical steps in the process is the reduction in the third zone of FeO to Fe. Most of the sintering and agglomeration occurs when operating at elevated temperatures in this zone. In accordance with the invention, in order to prevent this from occurring, the FeO fed into the FeO–Fe reducing zone is carbonized by cracking a suitable hydrocarbon at about 1800° F. over the iron. Thus the iron ore on being reduced from FeO to Fe, is covered by a layer of carbon, which carbon prevents agglomeration, sintering and back-oxidation of the reduced iron. The cracking of the hydrocarbon feed produces an off gas of hydrogen, and elemental carbon. The hydrogen reacts with the iron oxide to form water while reducing iron oxide to metallic iron. Simultaneously, the water thus formed gasifies a certain amount of carbon to form carbon monoxide, which in turn can react with the iron oxide to form carbon dioxide and metallic iron. The carbon dioxide thus formed can react with carbon to form more CO which also reacts with FeO to form Fe.

The hydrocarbon feed rate is so set as to provide an atmosphere which is reducing to the FeO, and to meet the over-all heat requirements of the entire process while simultaneously satisfying the equilibrium relationship in the reducing zones. Heat is supplied to this zone by circulating carbon covered iron through a transfer line burner, to which burner is fed a combustible fuel and air. By operating this burner at very short solids contact time, e.g., less than two seconds, it is possible to selectively burn the combustible fuel rather than the carbon or iron. Essentially no reoxidation of the reduced carbon coated iron takes place in the burner. The fuel added to the burner consists primarily of the off gases from the $Fe_3O_4$ reducing zone. The off gas fuel may be supplemented when needed with naphtha.

The gases generated by the cracking of the hydrocarbon feed to the FeO–Fe reducing stage produced the fluidizing gases for this zone and maintained this zone as a dense fluid bed. The gases produced consist primarily of hydrogen and CO and of minor amounts of $CO_2$ and water. The off gases from this zone pass upwards to the $Fe_3O_4$–FeO reducing zone, wherein they reduce $Fe_3O_4$ to FeO.

In a modification of this invention, not shown by the attached drawing, part of the solids from the transfer line burner cyclone can be routed to the $Fe_3O_4$ reducing zone to heat this zone without obtaining any appreciable change in the oxygen content of the circulated iron. This can be accomplished by a small increase in hydrocarbon fuel to the process which maintains the outlet gas composition from the $Fe_3O_4$ reducer at or below the equilibrium $CO_2/CO$ and $H_2O/H_2$ value for the FeO–Fe reduction. The additional fuel can be added either to the FeO reducer or to the $Fe_3O_4$ reducer. By operating with part of the heated solids from the transfer line cyclone routed through the $Fe_3O_4$ reducing zone before returning to the FeO reducing zone, it is possible to obtain independent temperature control of the $Fe_3O_4$ reducing zone. In many situations this can have considerable advantages.

The gases leaving the transfer line burner cyclone are reducing relative to the $Fe_2O_3$ and $Fe_3O_4$ equilibrium and are used to accomplish this reduction. The off gases from the $Fe_2O_3$ reducing zone are used in a short contact time preheat cyclone to preheat the iron ore fed to the first reduction stage.

It is essential for the process of the invention that the hydrocarbon fed to the FeO–Fe reduction zone be so controlled that the ratios of $CO_2/CO$ and $H_2O/H_2$ in the exit gas will remain below that in which oxidation of the metal becomes prevalent while at the same time this ratio must be so adjusted as to maintain an oxidizing potential adequately high to substantially reduce excessive carbon deposition on the reduced iron of the carbon produced by cracking of the hydrocarbon feed. The amount of carbon deposited on the iron is critical to the extent that if excessive amounts of carbon are deposited, the reactions becomes more highly endothermic, requiring additional heat to be added to this zone to carry out the reaction. In addition it represents a substantial heat loss, thus increasing the fuel requirements to carry out the reducing reaction.

A preferred embodiment of the present invention calls for direct injection of hydrocarbons to a reducing zone in which zone the hydrocarbons are cracked forming the reducing gases and in which zone the iron oxide is reduced to metallic iron. The reduced iron is covered with a protective coating of carbon, which helps to prevent back-oxidation and which renders the iron non-pyrophoric, as well as preventing agglomeration and sintering in the reducing zone. The gases formed in this zone are used as the reducing gas in the other stages and are also used as the fuel which is burned with an oxygen-containing gas which heats the cycled iron in the transfer line burner. The heat adsorbed by this iron plus carbon provides the heat necessary to carry out the endothermic reduction and cracking reactions carried out in the ferrous reducing zones. By cycling and heating reduced iron plus carbon, which is the heat carrier, from the burning zone to the reducing zone, the necessity and difficulties involved in separating an inert heat carrier from the reaction materials is overcome. The iron heat carrier is not reoxidized and is the product and is merely removed from the reducing zone. The cost of the synthesis gas is reduced by burning the off gases to heat the cycled iron. The amount of air required and cycled in the process is reduced by using the oxygen in the iron oxides to provide the oxygen need in the reducing zone.

The figure of the drawing shows a schematic diagram of the reducing zone, the transfer line burner, a melting zone and the method by which a preferred embodiment of this invention is carried out.

The hydrocarbon fuels fed to the FeO–Fe reduction zone which are cracked to produce the reducing gases and which reduce the FeO to Fe may be normally gaseous hydrocarbon such as natural gas, methane, ethane, propane, butane, or normally liquid hydrocarbons such as gasoline, naphtha, kerosenes, gas oils, light vacuum gas oils, heavy vacuum gas oils, fuel oils, diesel oils, residual hydrocarbons and the like. The amount of fuel required to reduce a specific amount of iron ore will depend on the fuel that is used. A preferred fuel would be a heavy liquid hydrocarbon of low sulfur and metal content. The off gases from the reducing zones are partially oxidized in the transfer line burner with an oxygen-containing gas.

Generally, air is used. Iron ores with varying degrees of purity may be reduced in accordance with the present invention. The ores reduced will generally consist primarily of $Fe_2O_3$. Before being fed to the iron ore reducing zone the ore is pulverized to reduce it to a suitable size so that they may be fluidized and the reactions may be carried out in dense fluid beds.

The degree of reduction of the iron oxides in the bed in which the hydrocarbons are injected is critical and carefully controlled. This bed contains FeO being reduced to Fe and large amounts of Fe. These materials are the catalyst for cracking the hydrocarbons and producing the reducing and fluidizing gases. The reactions in this zone are controlled so that the inventory contains between 2 to 20% of carbon based on iron. The average carbon level is controlled so that every particle has at least some carbon. The reduced iron with a carbon coating is withdrawn as product or recycled to the transfer line burner at such rates to maintain the desired percentage of carbon on the iron and to maintain the correct catalyst composition to carry out the desired reduction.

The pressures are generally not considered to be an important variable in the process except insofar as necessary to maintain a proper flow of solids through the system. In general, the process is operated at pressures from about atmospheric to 150 p.s.i.g. However, pressures above or below these may be employed if it is so desired. It is not intended to restrict the process of this invention to particular pressures. Also, the pressures may be varied in accordance with the reactions carried out in a particular zone so that the gas is either oxidizing or reducing to the reactants as necessary.

The conditions of temperature and ratio of $CO_2$ to $CO$ and $H_2O$ to $H_2$ in each of the reducing zones as well as in the transfer line burner are critical and will be described in detail. These conditions are so adjusted that the entire process is balanced as to endothermic and exothermic reactions and the necessary heat to carry out the endothermic reactions is produced in the transfer line burner which transfer line burner uses as its primary fuel the off gases from one of the reducing zones. The iron ore reduction may be carried out in one, two, or three reducing stages, each stage containing one or more beds.

In a preferred embodiment of this invention iron ore is reduced in three stages. In the first stage, the iron ore, $Fe_2O_3$, is reduced to $Fe_3O_4$ at a temperature of 1300–1500° F. though temperatures of 1200 to 1800° F. can also be used and at pressures of 0 to 35 p.s.i.g. though pressures of 0 to 300 p.s.i.g. can also be used. Due to the high state of oxidation of the iron ore, reducing gases containing relatively large amounts of $CO_2$ and $H_2O$ can be efficiently utilized to reduce the $Fe_2O_3$ to $Fe_3O_4$. The off gases from this stage contain a ratio of $CO_2$ to $CO$ of 50 to 300 and perferably of 200 to 250 and of $H_2O$ to $H_2$ of 50–250 and preferably of 150–200. The greater the degree of reduction of the iron ore, the more critical becomes the concentration of $CO_2$ and $H_2O$ in the reducing gases. In the $Fe_3O_4$ reducing zone, temperatures of 1200–1600° F. can be used while temperatures of 1300–1500° F. are preferred. The ratio of $CO_2$ to $CO$ can be .2–1.5, with .75–1.0 being preferred. The ratio of $H_2O$ to $H_2$ can be 0.2–3.0 with the ratio of 0.5–1.0 being preferred. These ratios relate to these continuents in the off gas from this zone. The off gases from the $Fe_3O_4$ reduction stage have a considerable amount of heat value and are used as the primary fuel to the transfer line burner where they are partially oxidized with air to provide the necessary heat for heating the iron particles which are cycled back to the reducing zone to provide the endothermic heat for the reactions therein carried out.

In the FeO to Fe reducing zone, temperatures of 1300–1900 are used with temperatures of 1600–1800° F. being preferred. In this zone the ratio of $CO_2$ to $CO$ is controlled so that it is reducing for FeO to Fe. A ratio of 0.2–0.6 is used with a ratio of 0.2–.40 being preferred. The ratio of $H_2O$ to $H_2$ can be 0.2–0.6. Preferably a ratio of $H_2O$ to $H_2$ of 0.3–0.5 is maintained. The above ratios represent the maximum amount of oxidation of the reducing gases allowable in this zone and are also the same for the off gas from this zone. In order not to use excessive amounts of hydrocarbons the amount of carbon deposited on the reduced iron in this stage is maintained at about 0.2 to 10.0 wt. percent based on weight of iron. Preferably, by closely controlling the conditions in this stage, 3.0 to 6.0 wt. percent carbon can be deposited on the reduced iron. Just enough carbon is deposited on the reduced iron to prevent agglomeration and sintering, to maintain the iron in a non-pyrophoric condition, and to protect the iron against reoxidation in the transfer line burner. Excessive deposition of carbon on the iron increases the amount of heat required to carry out the cracking operation and generally results in a less efficient reduction and cracking step. The conditions in this stage are carefully controlled so that only the minimum net amount of carbon desired is deposited on the reduced iron. Also the flow of FeO to this stage which is to be reduced to Fe is carefully controlled so that there is enough oxygen introduced into this zone with the FeO to react with the cracked products from the hydrocarbon cracking reaction to produce carbon monoxide and water needed to manufacture the reducing gases. By controlling the rate of feed of the FeO to this zone temperature and pressure, there is sufficient oxygen supplied with the FeO introduced to this zone to react with the carbon formed from cracking of the hydrocarbon so that only a minmum amount of carbon is deposited on the reduced ore. Due to carrying out this reaction in a fluidized bed, reduced ore with 3.0–6.0 wt. percent of deposited carbon for example, can be rapidly removed from this zone and/or cycled to the transfer line burner.

Essentially all of the heat to carry out the reduction and cracking reactions in accordance with this process is generated in the transfer line burner. Air and fuel preheat is added externally. Part of the heat generated in the burner is adsorbed by the carbon coated Fe in the burner and transferred to the reducing zone as sensible heat in the circulating heated reduced carbon coated iron. A portion of the heat is transmitted to the reducing zone through the hot off gases from the transfer line burner which are fed to the $Fe_2O_3$ reducing zone and heat the iron oxide in this zone while reducing the iron. The primary fuel to the transfer line burner is the off gases from the $Fe_3O_4$ reducing zone. However, when necessary other combustionable fuel may be added to the burner. The off gases from the $Fe_3O_4$ reducing zone have a relatively high concentration of carbon monoxide and hydrogen and a high heat of combustion. These gases are partially oxidized in the transfer line burner wherein a portion of the carbon monoxide is oxidized to carbon dioxide and the hydrogen to water, thereby generating considerable amount of heat which is adsorbed as sensible heat by the circulating carbon coated reduced iron. Only enough CO and $H_2$ remain in the gas to reduce the $Fe_2O_3$ to $Fe_3O_4$.

The off gases from the transfer line burner, at very high temperature, are used to provide heat and are used as the reducing gases for the $Fe_2O_3$ reducing zone. Due to the very high state of oxidation of the ore in this zone, the relatively high ratio of $CO_2$ to $CO$ and of $H_2O$ to $H_2$ in the combustion gases from the burner are not detrimental to this reduction and the gases still have sufficient reducing power to reduce the $Fe_2O_3$ to $Fe_3O_4$. The combustion conditions in the transfer line burner are critical since it is desired to obtain maximum efficient burning of the off gases with air to increase the temperature of the recycled iron and still not oxidize the carbon coating nor back-oxidize the reduced iron. Back-oxidation of reduced iron does not occur since the carbon coating protects the iron and would be preferentially first oxidized under the conditions utilized in the transfer line burner.

In the transfer line burner, the temperature is maintained at about 1400–2200° F. though temperatures of 1600–2000° F. are preferred while carrying out the oxidation of the off gases. This oxidation reaction increases the temperature of the recycle iron by about 100–300° F., preferably the increase in temperature is 100–200° F. The most important factor in preventing the back-oxidation of the reduced iron in the transfer line burner is to maintain the residence time in the burner very short. The residence time of the reduced iron in the transfer line burner is 0.1 to 2.0 seconds, though periods of 0.1 to 0.5 second are preferred. The solids and gases in the transfer line burner are contacted and the gases reacted under a condition of dispersed and violently moving gas-solids phase. The ratio of $CO_2$ to CO in the transfer line burner is 2.0–10.0 and the ratio of $H_2O$ to $H_2$ in the transfer line burner is 1.5–25.0. The preferred ratio of $CO_2$ to CO is 4.0–6.0 and the preferred ratio of $H_2O$ to $H_2$ is 4.5–12.0.

By carefully controlling the combustion in the transfer line burner, i.e., the ratio of $CO_2$ to CO, $H_2O$ to $H_2$ and the residence time the off gases will be preferentially burned and the reduced iron not back-oxidized. Off gases are cycled to the transfer line burner from the reducing zone with the proper ratios of $CO_2$ to CO and $H_2O$ to $H_2$ at a rate of about 18,000–26,000 s.c.f. per ton of iron, preferably at a rate of 20,000–24,000 s.c.f. of gases per ton of iron. Air is fed to the transfer line burner at a rate of 1.0–1.25 s.c.f. of air per s.c.f. of off gases and preferably at a rate of 1.0–1.1 s.c.f. of air per s.c.f. of off gases.

A 1,000 tons of reduced iron per day reactor having three stages of reduction can have a 12 foot diameter and an over-all height of 90 feet. A transfer line burner to supply the necessary heat for carrying out the endothemic reactions to be used with such a reactor zone can be 2–6 feet in diameter and 15–45 feet in height. Suitable pumps, valves, furnace heaters, cyclones to separate solids from gases, connecting downcomers, and risers are utilized in a manner coventional in the art. Instead of carrying out the reduction in a three bed system, a one or two bed system can be used. Also, the beds may be broken into preheat sections and reducing sections. The number of beds used to carry out the reduction reaction does not form a critical part of the invention.

The heated solids from the transfer line burner can all be returned to the FeO/Fe zone or can be diverted to the $Fe_3O_4$ or the $Fe_2O_3$ zone. The latter will result in some back-oxidation of the circulating solids. Preferably, all the heated solids are returned to the FeO zone. Also, additional hydrocarbon fuel and oxygen may be added to the transfer line burner to provide any additional heat needed to carry out the endothermic reactions. However, it is preferred to use primarily off gases from one of the reducing zones, preferably the $Fe_3O_4$ zone to conserve on fuel, thus reducing the cost of the over-all process. Also, depending on the degree of control it is desired to exercise over the over-all process the iron ore circulated to the transfer line burner may be carbon coated or not carbon coated. However, if it is carbon coated, the degree of control required for the heating in the transfer line burner is not as stringent as if it is not carbon coated.

In accordance with a preferred embodiment of the invention, a three-stage reduction zone is operated in conjunction with an external transfer line burner. In this embodiment valves 35, 38 and 39 are closed. Referring to the figure of the drawing a hydrocarbon fuel such as light naphtha is introduced through line 2 into preheat furnace 1 in which it is heated to a temperature of about 900 to 1000° F., but below the temperature at which the naphtha forms coke in the furnace. The preheated fuel is then fed to bed 9 of reducing vessel 6 through line 2. The naphtha is sprayed directly into the fluidized bed containing FeO and Fe wherein the reduced iron acts as a catalyst and cracks the naphtha to elemental carbon and hydrogen. Cracked products react with FeO in the fluidized bed reducing the FeO to Fe while oxidizing carbon to carbon monoxide and carbon dioxide and hydrogen to $H_2O$. Carbon monoxide may react further with the $H_2O$ to produce carbon dioxide and hydrogen and the hydrogen may react with additional FeO to produce $H_2O$ and Fe.

The temperature in bed 9 is maintained at about 1600–1800° F. The ratio of the $CO_2$ to CO in bed 9 is critical and is carefully controlled and maintained at 0.2–0.4 while the ratio of $H_2O$ to $H_2$ in the bed, which is also critical, is maintained at 0.3–0.5. Additional FeO is continuously introduced from bed 11 through downcomer 22 at a sufficient rate to provide the necessary amount of oxygen to the bed to produce carbon monoxide and $H_2O$, which is needed to produce the synthesis gas for carrying out the reduction. The rate of introduction of FeO is critical since if not enough oxygen is introduced to bed 9 by this means, excessive amounts of carbon will be deposited on the reduced ore. Also the introduction of fuel must be controlled so as to control heat and material balance while maintaining satisfactory gas combustion to carry out the process as described. The rate of flow of FeO to bed 9 is controlled by means conventional in the art. The rate of withdrawal of reduced iron through lines 23 and/or 25 is controlled in such a manner that excessive amounts of carbon is not allowed to build up on the reduced iron and the amount of reduced iron maintained in bed 9 is controlled so the proper ratio of FeO to Fe is present so that the desired reactions are carried out.

The cracking and reducing reactions carried out in bed 9 are highly endothermic and a large amount of heat is required to be introduced into bed 9 to maintain the reaction temperature. The cracked and partially oxidized cracked products, namely, $H_2$, CO, $H_2O$ and $CO_2$, provide the fluidizing gas to maintain bed 9 as a dense fluidized bed. These gases pass through bed 9, through space 10, and through fluidizing grid 7 or other suitable device and are introduced into bed 11 where the gases fluidize the $Fe_3O_4$ in this bed, maintaining a dense fluidized bed. In this bed the fluidizing gases reduce the $Fe_3O_4$ to FeO. $Fe_3O_4$ is continuously introduced to bed 11 from the $Fe_2O_3$ reducing zone 13 by downcomer 21. The rate of introduction of $Fe_3O_4$ to bed 11 is controlled by means conventional in the art. In bed 11 the CO and $H_2$ in the reducing gases are partially oxidized to $CO_2$ and $H_2O$ while reducing the $Fe_3O_4$ to FeO. Bed 11 is maintained at a temperature of about 1300–1500° F. and the ratio of $CO_2$ to CO in this bed is .75–1.0 and of $H_2O$ to $H_2$ in this bed is 0.5–1.0. Only part of the CO and $H_2$ from bed 9 introduced into bed 11 is oxidized to $CO_2$ and $H_2O$. There is a considerable amount of CO and $H_2$ remaining in this gas. The gas flows into space 12 and is withdrawn through line 14 into cyclone 4 wherein any entrained solids are separated and returned by line 42. The gas from cyclone 4 is passed to transfer line burner 5 via line 26. This gas has a high calorific value and is partially oxidized in transfer line burner 5 with air to heat the reduced carbon coated iron circulated to burner 5. Transfer line burner 5 provides the heat to bed 9 and in some cases to bed 13 to carry out the endothermic reduction and the endothermic reduction and cracking reactions carried out in beds 13 and 9.

In bed 9 cracking and partial oxidation of the cracked products is carefully controlled so that the amount of carbon deposited on the reduced iron withdrawn is maintained at about 3.0 to 6.0 wt. percent and as this average amount of carbon is deposited on the reduced iron, the iron is withdrawn. Part of the carbon coated iron is withdrawn through line 23, valve 34 and line 30 and is the product of this invention. The carbon coating on the iron makes it non-pyrophoric and easier to handle. The remainder of the carbon coated iron is circulated to transfer line burner 5. The combustion air for burner 5 is introduced through line 3 into preheat furnace 1 where the temperature of the air is increased to about 900 to 1800° F. The off gas in line 26 picks up carbon coated reduced iron from line 25 and carries it through riser 25 into transfer line burner 5 where it is contacted with preheated air. At the transfer line burner inlet preheated air in line 3 is mixed with off gases which contain the carbon coated reduced iron from bed 11. In transfer line burner 5 the off gases are partially oxidized by the preheated air raising the temperature of the carbon coated iron particles by 100–200° F. The transfer line burner is operated at a temperature of 1600–2000° F. Residence time of the carbon coated iron particles in a transfer line burner is 0.1–0.5 second.

Reduced iron can be heated in a transfer line burner with or without a carbon coating. However, the conditions for carrying out the heating are less critical if the particles are coated with carbon. In a preferred embodiment the reduced iron particles are coated with 5 to 10 wt. percent carbon. The ratio of $CO_2$ to CO in the transfer line burner is 4.0–6.0 and a ratio of $H_2O$ to $H_2$ is 4.5–12.0. Only a sufficient amount of air is added to the transfer line burner to partially oxidize the off gases to impart to the carbon coated reduced iron particles the necessary increase in sensible heat to provide the heat necessary to carry out the reactions in bed 9. The thus heated carbon coated reduced iron particles are circulated at a sufficient rate to transfer this heat to bed 9. The amount of heating in burner 5 and the amount of solids circulated can be adjusted to provide the necessary heat to carry out the desired cracking and reduction reactions in bed 9.

The reducing gases from bed 11 are only partially oxidized in transfer line burner 5, the overhead gases from transfer line burner 5 together with the heated reduced iron particles are withdrawn through line 32 and introduced to cyclone separator 28. These off gases are at a temperature of about 1600 to 2000° F. Cyclone separator 28 removes the solids and feeds them through line 29 back to bed 9 wherein the hot reduced iron particles provide the necessary heat for carrying out the reactions in bed 9. The separated overhead gases are taken through line 27 and introduced to space 36 and through fluidizing grid 8. The hot gases heat, fluidize, and reduce the iron oxides in bed 13. Since the iron oxides in bed 13 are at a high state of oxidation, $Fe_2O_3$, the off gases in line 27 still have sufficient reducing power to reduce the iron from this high state of oxidation to a lower state of oxidation. This is true even though these gases have a relatively high concentration of $CO_2$ and $H_2O$ due to the partial combustion in transfer line burner 5. The ratio of $CO_2$ to CO is about 4.0 to 6.0 and $H_2O$ to $H_2$ is about 4.5 to 12.0.

Iron ore feed is introduced through line 19 into cyclone heater 16, or other suitable contacting device, wherein the ore feed is directly contacted with the hot off gases from bed 13 introduced through line 15 and the ore is preheated to a temperature of about 400 to 600° F. or higher. Preheated ore is introduced through line 20 into bed 13. The cooled off gases are removed from preheat cyclone 16 through line 17 and may be used by indirect heat exchange to heat other process streams. The $Fe_2O_3$ is reduced in bed 13 to $Fe_3O_4$. The heat to carry out the reduction is provided primarly by the hot gases introduced through line 27. The temperature of the reduction reaction in bed 13 is about 1300–1500° F. The ratio of $CO_2$ to CO is 200–250; of $H_2O$ to $H_2$ is about 150–200. The $Fe_2O_3$ reduced to $Fe_3O_4$ is withdrawn from bed 13 and introduced into bed 11 by downcomer 21 as previously described.

In another embodiment of the invention the carbon coated reduced ore is sent directly to an iron melter 31. In this case valve 34 is closed and valve 35 is opened. Valves 38 and 39 are either both partially opened or either one is opened and the other is closed. The hot carbon covered reduced ore is withdrawn from zone 9 and instead of being sent to storage via valve 34 and line 30 is sent directly to melter 31 which is maintained at a temperature of 2900 to 3000° F. by oxidizing the carbon cover on the reduced ore to CO and $CO_2$. The carbon in being oxidized heats the melter and melts the sponge iron to molten metal. Preheated air is introduced into the melter through line 44 to support combustion. The off gas or combustion gases from the melter are at a temperature of 2900 to 3000° F. and have a $CO_2$ to CO ratio of 0.10 to 0.50. The hot off gases are withdrawn through line 41 and introduced to a waste heat boiler 37 whereby they are reduced to a temperature of 1400° to 2000° F. These gases have a considerable amount of heating energy, fuel value and reducing capacity. The gases at this temperature may be introduced either to transfer line burner 5 for use a fuel or to either the $Fe_2O_3$ or $Fe_3O_4$ reducing zones for use as preheat and as a reducing gas. In the drawing the combustion gases are shown going through valve 39 and line 43 to the $Fe_3O_4$ reducing zone, and to heater 5 through valve 38 and line 26.

The function of the waste heat boiler is to reduce the temperature of the off gas from the melter from about 3000° F. to between 1400 and 2000° F. The gases can be much more easily handled at the lower temperatures. The burning of the carbon cover on the reduced iron in the melter and the utilization of the off gas for preheat, as a reducing gas and fuel represents a considerable savings in fuel for the process. The melted iron at about 3000° F. is withdrawn through line 33 and taken for further treatment. The heat adsorbed in boiler 37 is used as preheat or converted to power for use in the process.

The above description represents preferred embodiments of the present invention. Pumps, valves, cyclone separators, and numerous pieces of heat exchange equipment have been omitted in order to simplify the drawing but are used in a manner conventional in the art.

The reduced iron product coated with 2 to 10% carbon, made in accordance with this invention, may be easily handled and stored since in this condition it is non-pyrophoric. This material makes an ideal synthetic scrap and may be used as scrap in conventional steel making processes. The molten iron may be used directly in steel making processes.

The invention is further illustrated by the following example.

Light naphtha feed boiling in a range of 100 to 400° F. is preheated to a temparture of about 980° F. and introduced into a ferrous reducing zone containing FeO and metallic iron. The light naphtha is introduced to the ferrous reduction zone at a rate of about 450 pounds per ton of reduced iron ore product. The ferrous reduction zone is operated at a temperature of 1800° F. Under these conditions, the naphtha feed is cracked to hydrogen and elemental carbon. The elemental carbon reacts with the oxygen in the FeO to form carbon monoxide and carbon dioxide and the hydrogen reacts with the oxygen either in the carbon dioxide or in the FeO to form $H_2O$. The $H_2O$ may again react with CO to form $CO_2$ and hydrogen. These reactions take place simultaneously and the amount or degree to which each of the products are present will depend on the reaction conditions. The ratio of $CO_2$ to CO in the reaction zone is about 0.211 and the ratio of $H_2O$ to $H_2$ is 0.346. Reaction conditions are carried out so that 5.5% carbon is deposited on the reduced ore. The off gases from the FeO/Fe reducing zone are at a temperature of about 1800° F. The hot gases from the FeO reduction zone and the hot $Fe_3O_4$ from the $Fe_2O_3$ reduction zone provide the necessary heat to carry out the $Fe_3O_4$ reduction to FeO. 22,400 s.c.f. per ton of off gases from the $Fe_3O_4$ reducing zone are withdrawn at a temperature of about 1400° F. and are fed to an external transfer line burner wherein they are partially oxidized by adding 24,500 s.c.f. of air to the transfer line burner per ton of reduced ore product.

In the transfer line burner the temperature of the carbon coated reduced iron is increased by 120° F. above the temperature of the iron in zone 9. The residence time of the iron ore in the transfer line burner is about 0.2 second. The combustion gases from the transfer line burner are introduced into the ferric reduction zone ($Fe_2O_3$) wherein they heat this bed and function as a reducing gas to reduce the $Fe_2O_3$ to $Fe_3O_4$. These gases are at a temperature of about 1900° F. to 2000° F. and provide the necessary heat to carry out the endothermic reduction in the ferric reducing zone. The heated iron is circulated back to the ferrous reduction zone (FeO–Fe) at a recycle rate of 119,000 lbs. of Fe per ton of reduced iron produced. About 42,000 s.c.f. of gases per ton of reduced iron are removed from the cyclone separator and introduced into the $Fe_2O_3$ reduction zone. The overhead gases from the ferric reducing zone at a temperature of about 1200 to 1400° F. are used to preheat the ore to the ferric reducing zone from a temperature of about 77° F. to a temperature of about 400 to 600° F.

The information in Table I below shows the economies in fuel and in air requirements that can be obtained with direct injection of hydrocarbons using the transfer line burner principle as compared to direct injection of hydrocarbons and air into the reducing zone to provide the necessary heat for carrying out the endothermic reactions.

*Table I*

| Case | Direct Injection of Hydrocarbon and Air to Reducing Zones Without Transfer Line Burner | Direct Injection of Hydrocarbon and Transfer Line Burner |
| --- | --- | --- |
| Air Required—M s.c.f./t. of Iron | 42.3 | 23.4 |
| Fuel to Reducers—MM B.t.u.'s/t. of Iron | 12.4 | 8.6 |

It can be readily seen from the above table that the requirement for air by using a transfer line burner principle is reduced by about ½ and the requirement for hydrocarbon required to carry out the reaction is reduced by about ⅓. This represents a considerable savings in fuel costs and air fed to the process. It also represents a savings in the size of equipment, since smaller volumes of materials are circulated. This process considerably cheapens the cost of the synthesis gas and the amount of fuel required, thus making the process more efficient, more economical and more practical.

The above described process has overcome many of the shortcomings of the prior art known processes for carrying out reduction of iron ore by direct injection of hydrocarbons by the fluid bed technique. It is submitted, however, that the transfer line burner principle may be used in other direct iron ore reduction processes whether or not the reducing gases are produced by direct injection of hydrocarbons or by a separate gasification zone. The principle or inventive feature of the present invention is withdrawing a reduced iron from the ferrous reduction zone, heating it in an external heating bed, recycling the reduced heated iron back to the ferrous (FeO–Fe) reducing zone to provide the heat necessary for the endothermic cracking and reduction reactions. This technique solves the problem of introducing large amounts of heat to the reducing zone, and overcomes a problem and difficulty of separating inert heat carrier particles from the product.

The invention is not to be limited by the above description but solely by the appended claims.

What is claimed is:

1. A process of directly reducing iron oxides to metallic iron solid particles by injecting hydrocarbon fuel directly into the reducing zone and into contact with said oxides to crack same and to produce reducing gases which reduce the iron oxides to metallic iron, wherein the reducing reaction is endothermic requiring added heat, which comprises removing from the reducing zone a portion of the reduced iron solid particles, circulating the particles to an external heating zone, heating the reduced iron particles to a more elevated temperature, and recycling the heated solid iron particles to the reducing zone, thus adding heat to the iron reducing zone in sufficient quantities to carry out the desired reduction reaction.

2. A direct iron ore reduction process wherein iron oxides are reduced to metallic iron which comprises endothermically cracking a hydrocarbon fuel and endothermically reducing iron oxides to metallic iron solid particles in a reducing zone, in the absence of free oxygen, under reducing conditions to produce carbon and hydrogen, and wherein said carbon is substantially uniformly deposited on the reduced metallic iron particles, withdrawing a part of the carbon covered particles and circulating same to an external heating zone and then contacting same with an oxygen-containing gas and off-gas from the reducing zone whereby a portion of the off-gas is oxidized to heat said iron particles, and then recycling said heated particles to the reducing zone to provide the necessary sensible heat to carry out the endothermic reactions.

3. A direct reduction process for reducing iron oxides to metallic iron by conducting at elevated temperature a reaction in a dense fluidized bed of iron oxides and reduced iron solid particles, which comprises (1) feeding therein a hydrocarbon fuel and gasifying same with the oxygen contained in the iron oxides, to produce oxidation products including hydrogen and carbon, said carbon produced being deposited substantially uniformly on said reduced iron, (2) generating in said gasification reaction CO and $H_2$ and contacting said gases with iron oxides to endothermically reduce said oxides to metallic iron solid particles while simultaneously partially oxidizing said reducing gas, (3) withdrawing from said reaction zone a portion of the carbon coated reduced iron particles and circulating same to an external burner zone and therein providing heat for said endothermic gasification and reduction reactions by contacting said particles with an oxygen-containing gas and off-gases from a ferrous reducing zone containing $H_2$ and CO to exothermically burn some of said off-gas to $H_2O$ and $CO_2$ thus generating heat which is adsorbed as sensible heat by the particles to increase their temperature above the temperature of said reaction zone, and then (4) recycling the heated reduced iron solid particles from the burner to the reaction zone to provide the necessary heat to carry out the endothermic reactions.

4. The process of claim 3 wherein the combustion gases produced in the burner are contacted with ferric oxides in a ferric reducing zone to reduce the ferric to ferrous oxides.

5. A direct reduction process for reducing ion oxides to metallic iron which comprises (1) gasifying a hydrocarbon fuel in a reaction zone at elevated temperature with oxygen contained in iron oxides, wherein the temperature is maintained at 1300° F. to 1900° F. to produce hydrogen and carbon and oxidation products of hydrogen and carbon, said reaction being carried out in a dense fluidized bed of iron oxides and reduced iron particles, said carbon produced by said reaction being deposited uniformly on said reduced iron, (2) the gases from said gasification reaction comprising large amounts of CO and $H_2$ and being reducing in nature as to iron oxides, contacting said oxides with said CO and $H_2$ in said zone and endothermically reducing said oxides to metallic iron while partially oxidizing said reducing gas, the reducing gases passing to a fluidized bed of ferric oxides wherein they reduce the oxides to ferrous oxides, the iron in each of said fluidized beds flow from the ferric oxide zone to the ferrous oxide zone to said reaction zone, (3) the heat for said endothermic gasification and reduction reactions being provided by withdrawing a portion of the carbon coated reduced iron particles from said reaction zone and circulating them to an external burner wherein they are contacted with an oxygen-containing gas, and an off gas from a ferrous reduction zone, said off gases containing $H_2$ and CO, wherein some of said $H_2$ and CO are exothermically burned to $H_2O$ and $CO_2$ generating a large amount of heat, the residence time of said particles in said burner being 0.1 to 2.0 sec., which heat is adsorbed as sensible heat by the carbon coated reduced iron particles thus increasing their temperature above the temperature of said reaction zone, (4) recycling the thus heated reduced iron particles from the burner to a ferrous reducing zone to provide the necessary heat to carry out the endothermic reactions carried out therein.

6. The process of claim 5 wherein 2 to 10% by weight of carbon based on iron is deposited on the iron in said reaction zone.

7. The process of claim 5 wherein 50 to 70 tons of heated carbon coated reduced iron particles per ton of reduced iron product are circulated to the burner and recycled to a reaction zone to provide the necessary heat to carry out the endothermic reactions in said zone.

8. The process of claim 5 wherein said particles circulated to said transfer line burner are raised in temperature by 100 to 300° F. by burning CO and $H_2$ to $CO_2$ and $H_2O$ in said burner.

9. A direct reduction process for reducing iron oxides to metallic iron which comprises (1) gasifying a hydrocarbon fuel in a reaction zone at elevated temperature with oxygen contained in said iron oxides to produce hydrogen and carbon and oxidation products of hydrogen and carbon, said gasification and reducing reactions being carried out in a dense fluidized bed of iron oxides and reduced iron particles, depositing 2 to 10 wt. percent of said carbon, based on weight of iron, produced by said gasification reaction uniformly on said reduced iron, (2) the gases from said gasification zone comprising large amounts of CO and $H_2$ and being reducing in nature as to iron oxides, contacting said iron oxides with said gases in said zone, the ratio of $CO_2/CO$ and $H_2O/H_2$ in said zone being 0.2–0.4 and 0.3–0.5, respectively, and endothermically reducing said oxides to metallic iron while partially oxidizing said reducing gases, the reducing gases passing to a fluidized bed of ferric oxides wherein they reduce the ferric oxide to ferrous oxide, the iron in each of said fluidized beds flow from the ferric oxide zone to the ferrous oxide zone to the reaction zone, (3) the heat for said endothermic gasification and reduction reactions being provided by withdrawing a portion of the carbon coated reduced iron particles from said reaction zone and circulating them to an external transfer line burner wherein they are contacted with an oxygen-containing gas and off gas from a ferrous reduction zone, said off gas containing $H_2$ and CO, some of said $H_2$ and CO being exothermically burned to $H_2O$ and $CO_2$ generating a large amount of heat, the ratio of $CO_2/CO$ and $H_2O/H_2$ in said burner being 4.0–6.0 and 4.5 to 12.0, respectively, the residence time of said particles in said burner being 0.1 to 0.50 sec., which heat is adsorbed as sensible heat by the carbon coated reduced iron particles thus increasing their temperature by 100 to 200° F. above the temperature of said reaction and ferrous reducing zones, (4) recycling the thus heated reduced iron particles from the transfer line burner to a ferrous reducing zone to provide the necessary heat to carry out the endothermic reactions carried out therein.

10. The process of claim 9 wherein the temperatures in the ferric and ferrous reducing zones are maintained between 1300 to 1500° F., in the reaction zone between 1600 to 1800° F. and in the burner between 1600 to 2200° F.

11. The process of claim 9 wherein the reducing off gas feed to said burner has a ratio of $CO_2/CO$ and $H_2O/H_2$ of 0.75–1.0 and 0.5 to 1.0.

12. The process of claim 9 wherein the off gas from the ferric reducing zone has a ratio of $CO_2/CO$ and $H_2O/H_2$ of 200–250 and 150–200.

References Cited by the Examiner

UNITED STATES PATENTS

| | | | |
|---|---|---|---|
| 2,475,607 | 7/49 | Garbo | 75—26 |
| 2,790,710 | 4/57 | Cavanagh | 75—34 |
| 2,877,106 | 3/59 | Aspegren | 75—34 |
| 2,990,269 | 6/61 | Hyde | 75—34 X |
| 3,079,248 | 2/63 | Lewis | 75—26 |

DAVID L. RECK, *Primary Examiner.*